No. 634,685. Patented Oct. 10, 1899.
C. DYE.
APPARATUS FOR MANUFACTURING TUBES FROM GELATINOUS SUBSTANCES.
(Application filed Dec. 15, 1898.)
(No Model.) 3 Sheets—Sheet 1.
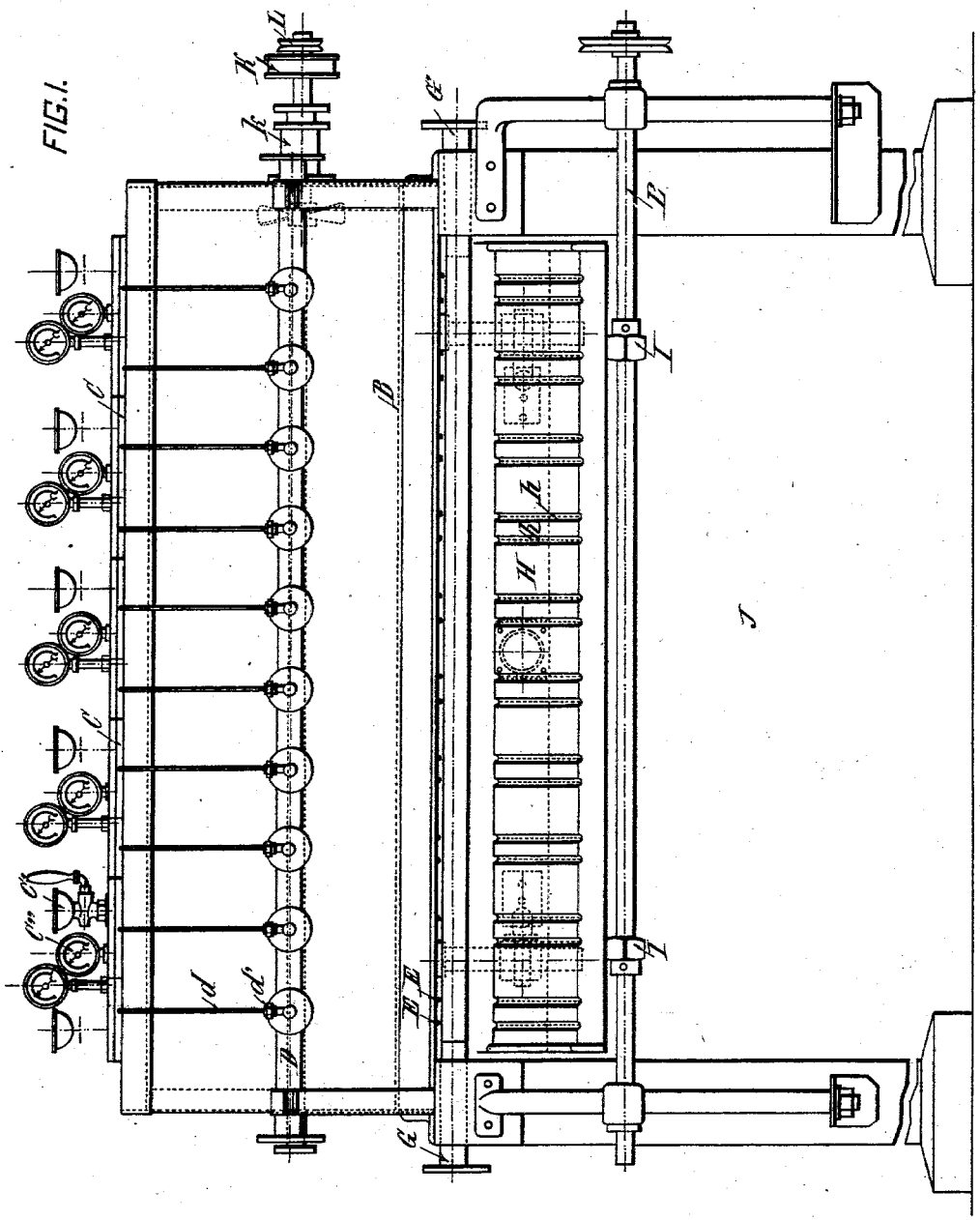

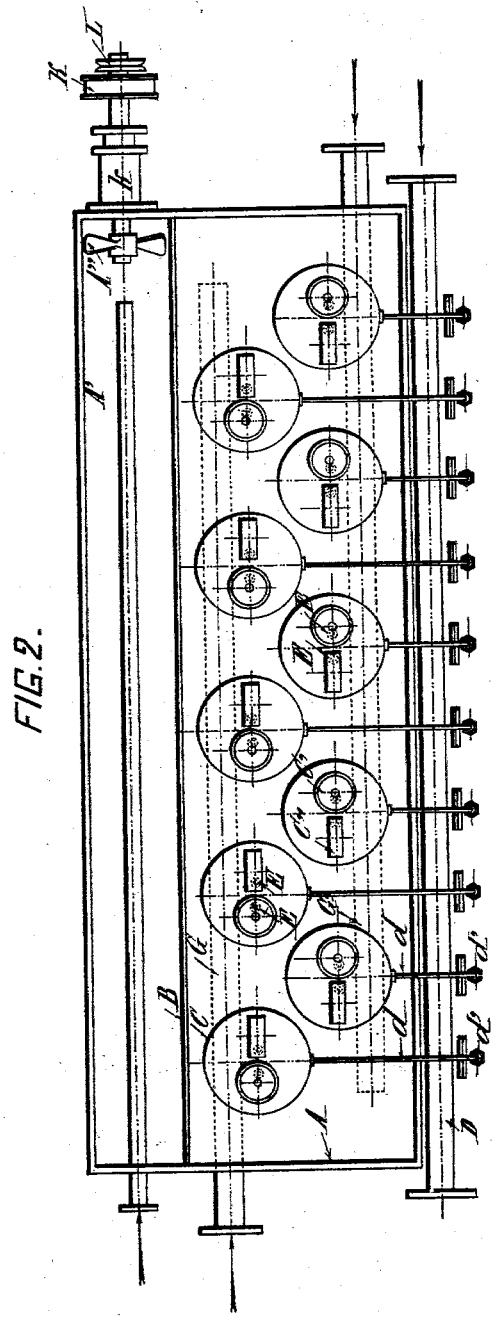

No. 634,685. Patented Oct. 10, 1899.
C. DYE.
APPARATUS FOR MANUFACTURING TUBES FROM GELATINOUS SUBSTANCES.
(Application filed Dec. 15, 1898.)
(No Model.) 3 Sheets—Sheet 3.
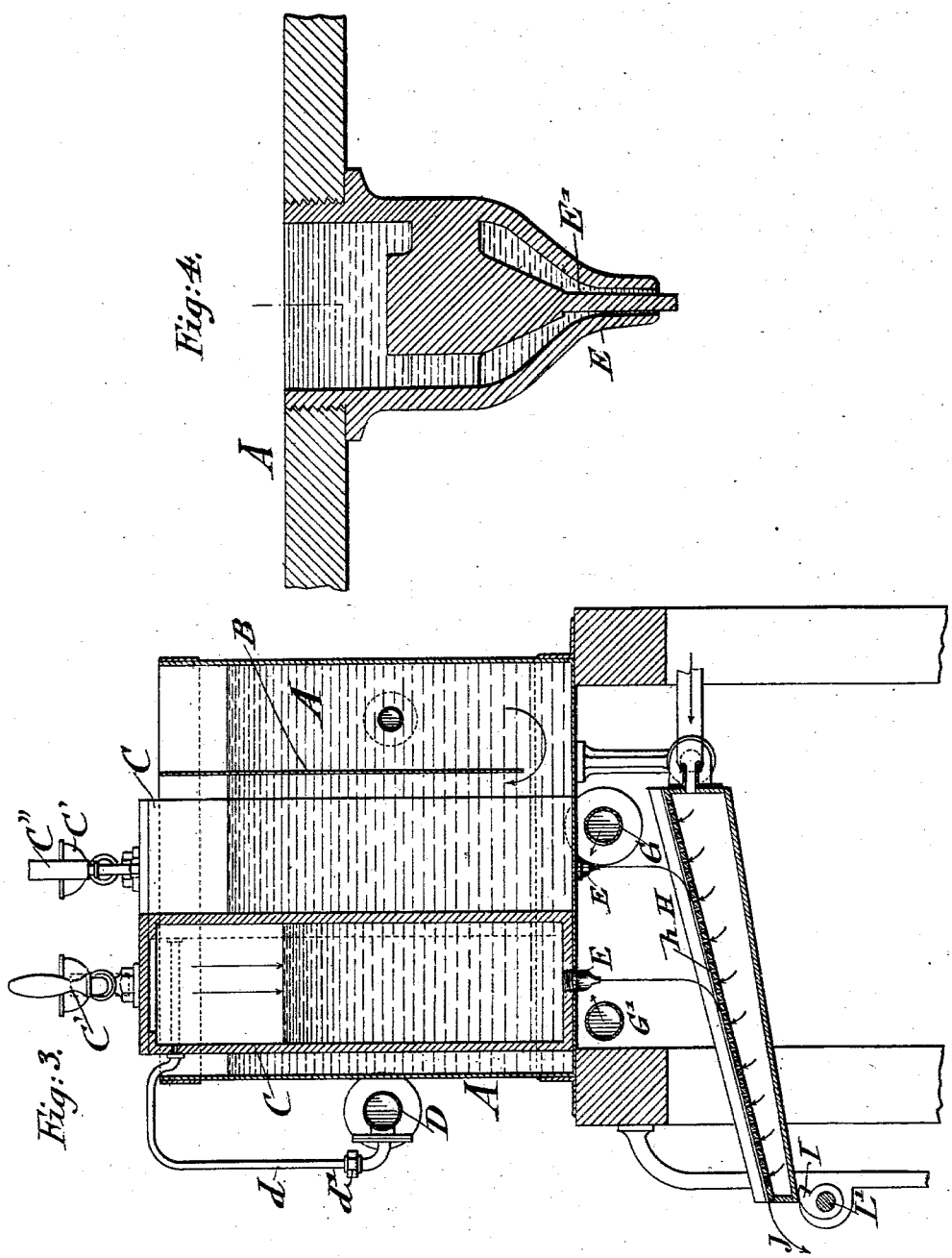

UNITED STATES PATENT OFFICE.

CHARLES DYE, OF PARIS, FRANCE.

APPARATUS FOR MANUFACTURING TUBES FROM GELATINOUS SUBSTANCES.

SPECIFICATION forming part of Letters Patent No. 634,685, dated October 10, 1899.

Application filed December 15, 1898. Serial No. 699,332. (No model.)

*To all whom it may concern:*

Be it known that I, CHARLES DYE, a citizen of the Republic of France, and a resident of Paris, France, have invented a new and useful Improvement in Apparatus for Manufacturing Tubes from Gelatinous Substances, which is fully set forth in the following specification.

This invention relates to an improved apparatus for manufacturing tubes from gelatinous substances, and is illustrated, by way of example, in the accompanying drawings, in which—

Figure 1 shows the apparatus in elevation and Fig. 2 in plan. Fig. 3 is an enlarged transverse section of Fig. 1, and Fig. 4 is a still larger section showing in detail one of the draw-nozzles.

The apparatus is chiefly constituted by a trough A, provided at B with a partition which does not reach the bottom of the trough, a free communicating space being left between said partition and the bottom of the trough.

In the trough A are arranged in rows or in any other suitable manner air-tight cylinders C, adapted to receive in their interior a certain pressure. Each of these cylinders C is provided at the top with a filling-cock C' and a pressure-gage C" for indicating the pressure in the interior of the cylinder.

On one of the longitudinal sides of the apparatus, as at D, is arranged a conduit for compressed air. From this conduit extend a series of pipes d, provided with cocks d'. Each cylinder C communicates with the conduit D by means of one of the pipes d.

The bottom of each cylinder is provided with draw-nozzles E—as a rule two for each cylinder—through which the material is forced out in a tubular form, as will be hereinafter explained.

Into each cylinder C is introduced the paste or gelatinous substance employed in the manufacture of the tubes. Into the trough A is then introduced hot water, which enters first into the compartment A', where it is subjected to the action of a worm or stirrer A", which equalizes its temperature. Then the hot water passes underneath the partitions B into the reservoir A, where it surrounds the cylinders C, and thus maintains the paste at the temperature required for the work. The cocks d' are then opened, so as to place each cylinder under the pressure of compressed air. This pressure forces out the paste in the shape of tubes through the draw-nozzles E, and these tubes are subjected at this point to the action of currents of cold air projected through orifices made in tubes G G' opposite or around the draw-nozzles E. The cold air thus projected upon the gelatinous tubes immediately solidifies them, and the tubes then fall on an inclined table H, provided with grooves h. This table is suspended and under the action of cams I receives a jerky motion, which prevents the tubes from sticking to it. The tubes finally pass at J under the apparatus, where they may be handled for sheathing or covering them in a suitable manner.

The required motion, both for the rotation of the worm A" and for the movement of the table H, is obtained by means of a transmission-gearing acting on a pulley K, keyed to the spindle $k$ of the worm A". A pulley L, keyed to said spindle $k$, transmits the motion to an auxiliary spindle L', carrying the cams I.

The draw-nozzles may be, of course, of any suitable shape and size, according to the kind of tubes to be manufactured.

The draw-nozzles E each contain a central head E', fixed therein, and a mandrel $E^2$, which extends through the mouth of the nozzle.

What I claim is—

1. An apparatus for manufacturing tubes from gelatinous substances, which consists of a cylinder provided with a draw-nozzle, means for heating the cylinder for maintaining the gelatinous paste in the same at the proper fluidity, means for subjecting the cylinder to internal air-pressure, and means for subjecting the formed tubes to the action of air-currents, as they issue from the draw-nozzle, substantially as set forth.

2. An apparatus for manufacturing tubes from gelatinous substances, which consists of a series of cylinders provided each with a draw-nozzle, means for heating the cylinders, means for subjecting the cylinders to internal air-pressure, an inclined table provided with grooves and onto which the formed tubes pass, and means for subjecting the tubes to the action of air-currents before falling onto said table, substantially as set forth.

In testimony whereof I have signed this specification in the presence of two subscribing witnesses.

CHARLES DYE.

Witnesses:
EDWARD P. MACLEAN,
JULES DELALIEUX.